Aug. 5, 1941.  A. A. KUCHER  2,251,490
REFRIGERATING APPARATUS
Filed Feb. 4, 1937    7 Sheets-Sheet 1

INVENTOR
Andrew A. Kucher
BY
Warren H. F. Schmeiding
ATTORNEY

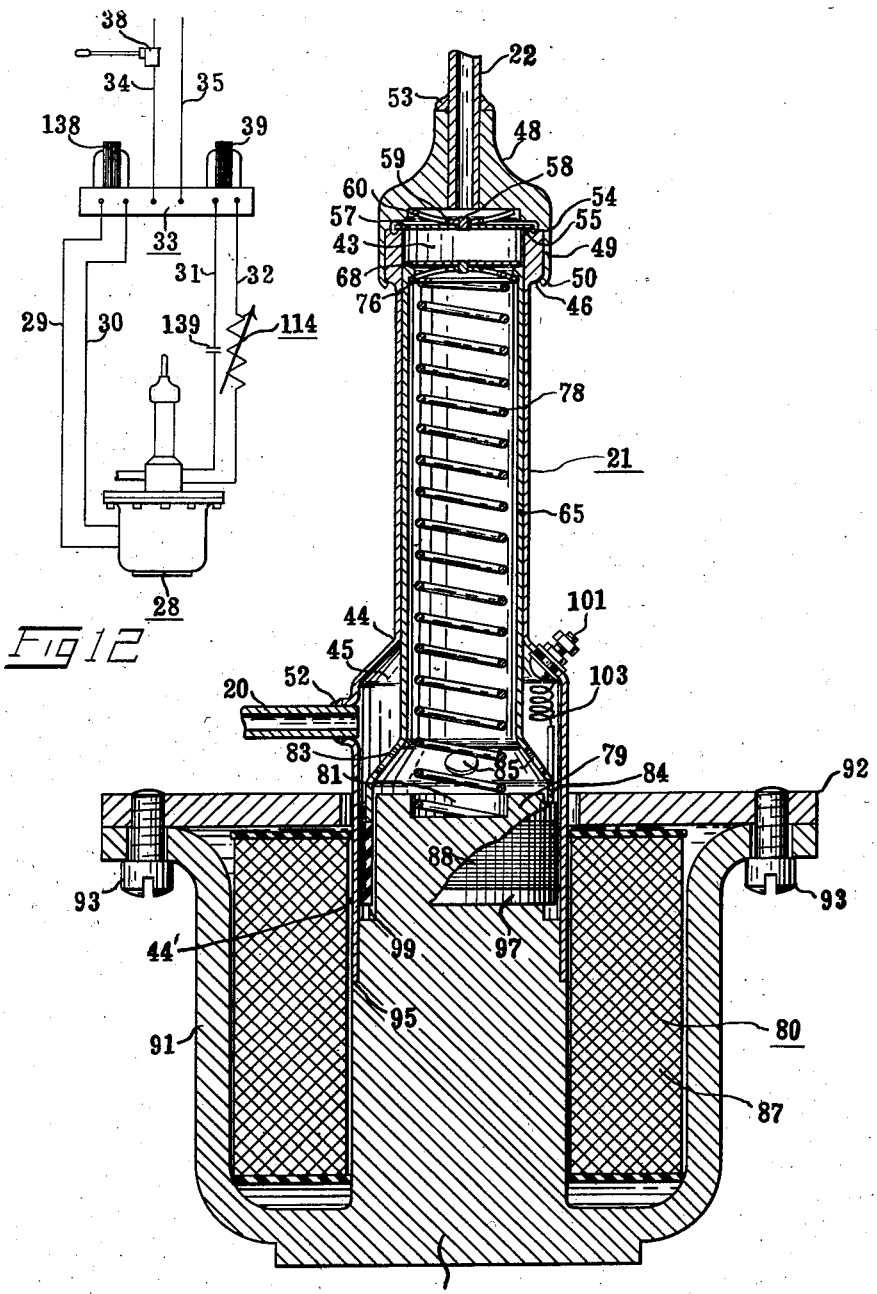

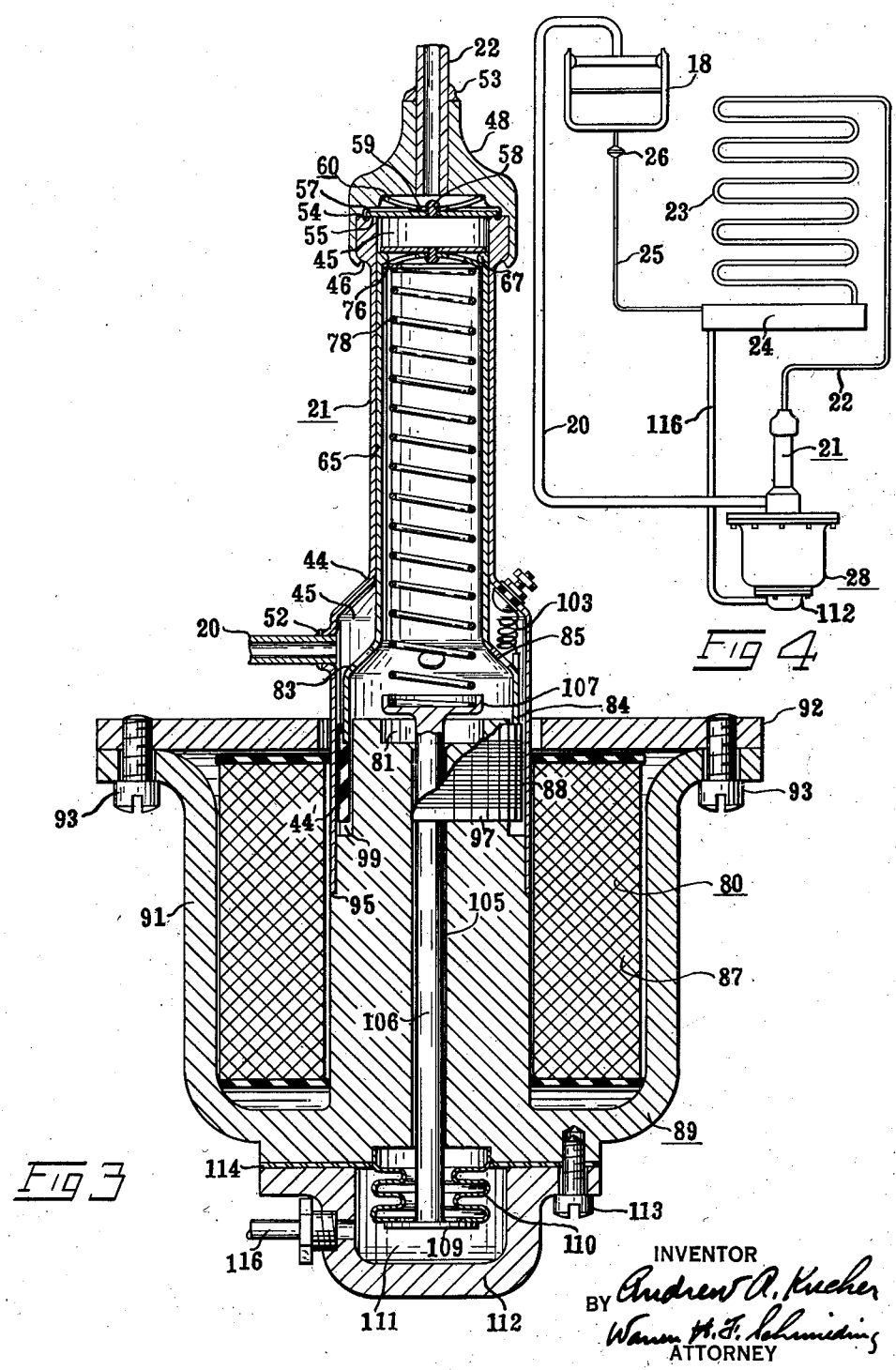

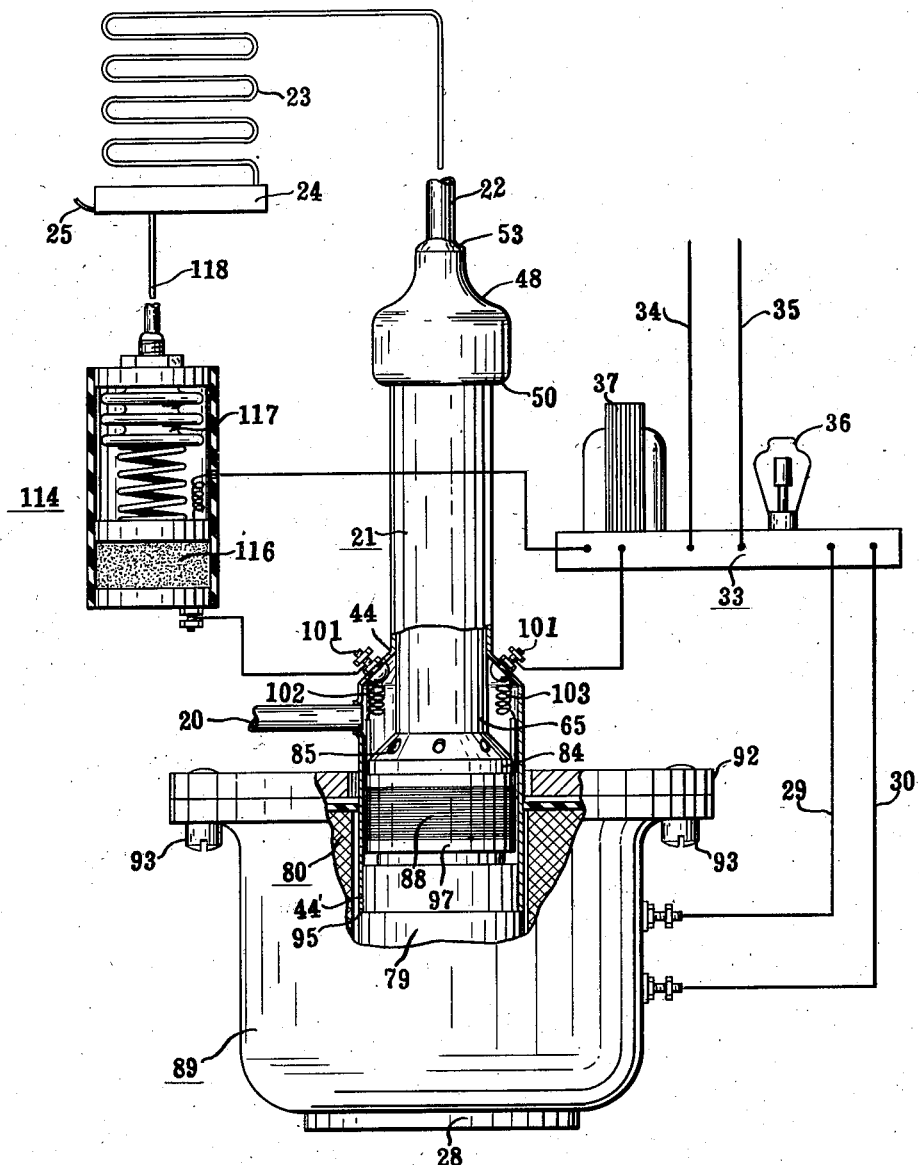

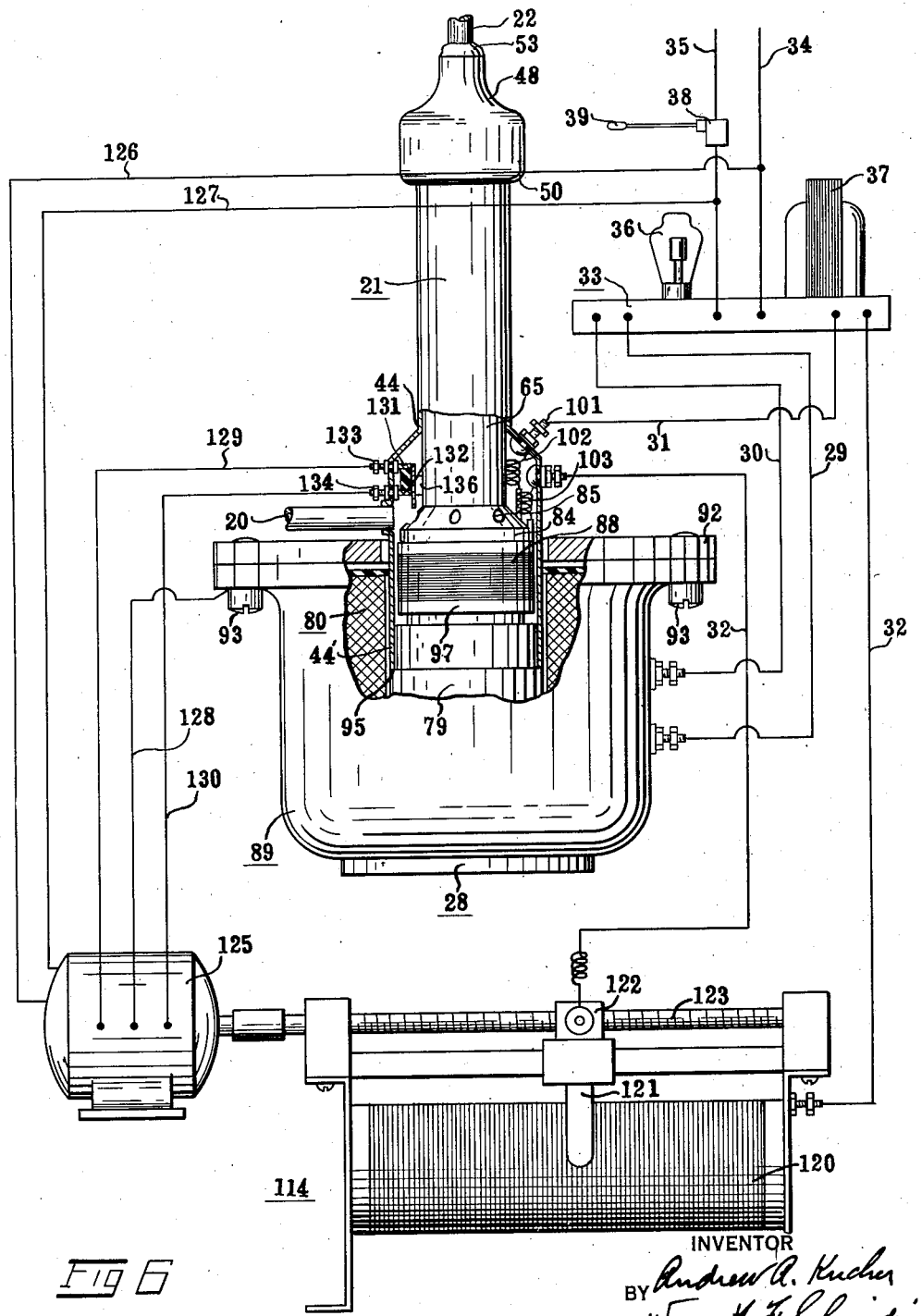

Aug. 5, 1941.  A. A. KUCHER  2,251,490
REFRIGERATING APPARATUS
Filed Feb. 4, 1937   7 Sheets-Sheet 6
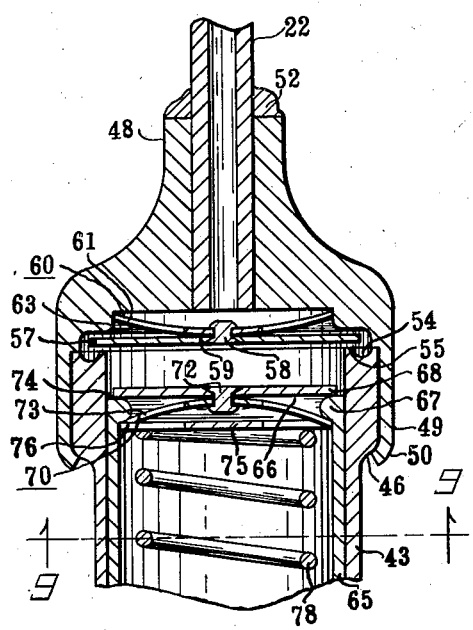
Fig 7
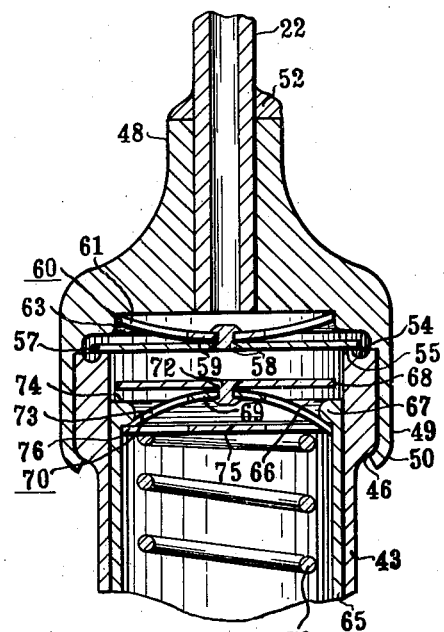
Fig 8
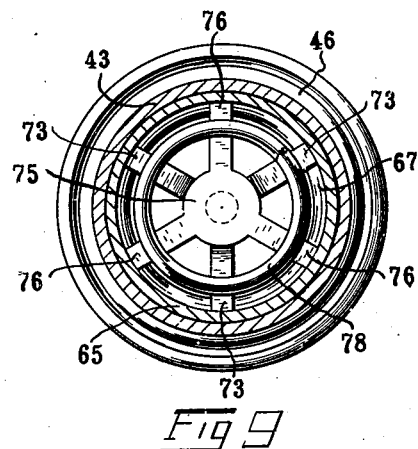
Fig 9
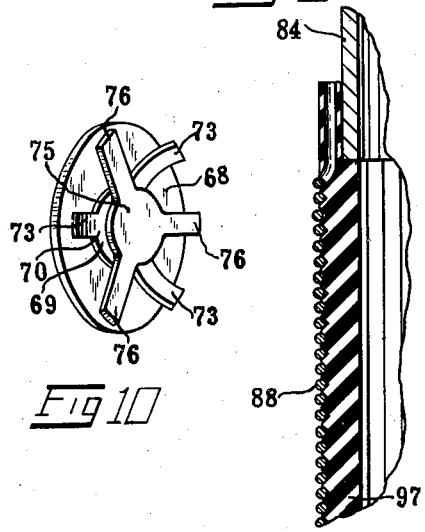
Fig 10
Fig 11
INVENTOR
Andrew A. Kucher
BY
Warren H. F. Schmieding
ATTORNEY Patented Aug. 5, 1941

2,251,490

UNITED STATES PATENT OFFICE 2,251,490

REFRIGERATING APPARATUS

Andrew A. Kucher, Dayton, Ohio, assignor to General Motors Corporation, Dayton, Ohio, a corporation of Delaware Application February 4, 1937, Serial No. 124,121

15 Claims. (Cl. 230—55)

The present invention relates to refrigerating systems and refrigerant compressing apparatus therefor.

One of the objects of the present invention is to drive the movable member of a compressor by a conductor motor of the dynamic type.

The movable member of the compressor is arranged to float as distinguished from a mechanically driven member. In such type compressors the pressure of the fluid being pumped has a tendency to vary the extent of movement of the floating member due to variations of the pressure of the fluid. Another object of the present invention is to prevent such variation of fluid from varying the extent of movement of the floatingly movable member. In carrying out this object, it is a further object to utilize the variations of the pressure of the fluid being compressed for compensationly varying the force of movement for the movable member whereby the extent of movement of the movable member is maintained uniform.

Such movable member may be actuated electrically and it is a still further object of the invention to vary the effect of the electrical driving energy in accordance with the variation of the pressure of the fluid.

Such movable member may be actuated by yielding means, such as a spring, in the one direction and electrically in the opposite direction. A further object of the invention is to utilize the variation of the fluid being compressed for varying the effectiveness of the yielding means, as for example, varying the tension of the spring.

Still another object of the invention is to control the extent of movement of the floating member by controlling the energization of the electrical apparatus.

A still further object of the invention is to provide an inwardly extending boss in that type of piston in which a valve is located in the head thereof and to attach a leaf spring to the valve and to arrange the leaf spring so that it resiliently engages the boss and yieldingly urges the valve on its seat.

In carrying out the last object, it is a further object of the invention to drive the piston through the boss.

Other objects of the invention are to provide an oilless mechanical type compressor and an oilless mechanical type refrigerating system by driving the movable member of the compressor entirely axially with respect to the stationary member by a conductor motor of the dynamic type.

Further objects and advantages will be apparent from the following description, reference being had to the accompanying drawings wherein preferred forms of embodiments of the present invention are clearly shown.

In the drawings:

Fig. 2 is a longitudinal sectional view of the compressor shown in Fig. 1;

Fig. 3 is a longitudinal sectional view of another form of the invention;

Fig. 4 is a diagrammatic view showing the compressor of Fig. 3 connected in a refrigerating system;

Fig. 5 is a side view of a compressor showing another form of the invention, parts thereof being shown in longitudinal section, and a diagrammatic view of the electrical system showing in section a pressure operated variable resistance;

Fig. 6 is a side view of a compressor showing another form of the invention, parts thereof being shown in longitudinal section, and a diagrammatic view of another form of electrical system and variable resistance;

Fig. 7 is a longitudinal sectional view, on a larger scale, showing the upper part of the compressor of types shown in the aforementioned figures;

Fig. 8 is a view similar to Fig. 7 but showing the valves in position opposite to that shown in Fig. 7;

Fig. 9 is a sectional view taken on line 9—9 of Fig. 7;

Fig. 10 is a perspective view of the piston inlet valve, the valve spring and the abutment for a piston operating spring;

Fig. 11 is a fragmentary longitudinal sectional view of the lower part of the piston and an operating coil therefor;

Fig. 12 is a diagrammatic view of an electrical system which can be substituted for the systems shown in Figs. 1, 5 and 6.

Figure 1:
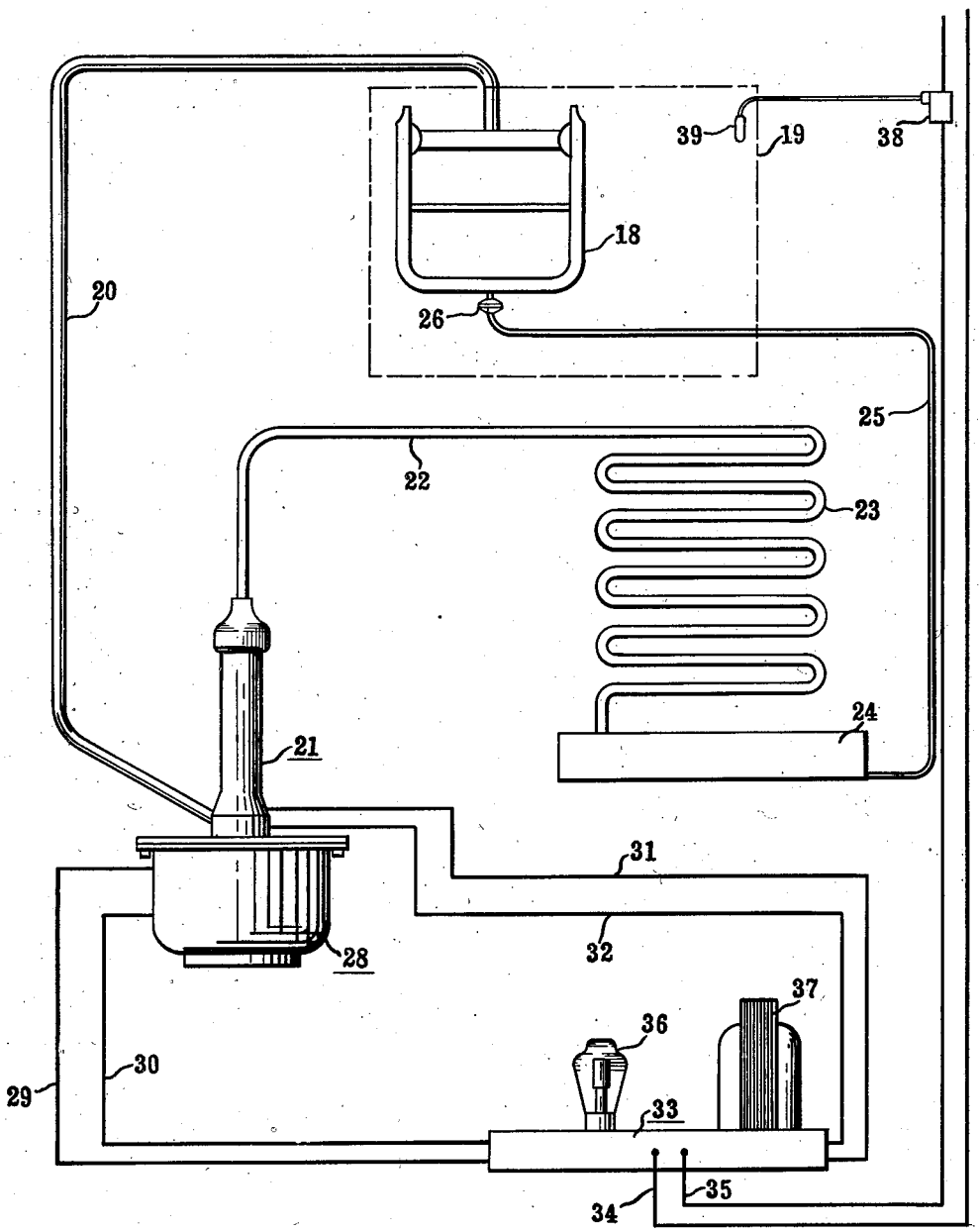
Fig. 1 is a diagrammatic view of my improved refrigerating system embodying one form of my improved compressor.

Referring in general to the drawings, Fig. 1 shows a refrigerating system including an evaporator 18 which is to be inclosed in a refrigerator cabinet 19. Gaseous refrigerant is withdrawn through a pipe 20 from the evaporator 18 by a compressor 21. The refrigerant is compressed by the compressor and flows through pipe 22 to a condenser 23 and then to a liquid refrigerant receiver 24. Liquid refrigerant is delivered from the receiver 24 by a pipe 25 to an automatically operated pressure reducing valve 26, whence the refrigerant flows to the evaporator 18.

In the embodiment used to illustrate a form of the invention, the compressor 21 is actuated by a conductor motor 28 of the dynamic type employing preferably a source of direct current indicated by wires 29 and 30 and a source of alternating current indicated by wires 31 and 32. These circuits are connected by a power-pack 33 connected with the alternating current mains 34 and 35 and including a rectifier 36 for converting the alternating current to direct current for the circuit including wires 29 and 30 and including a transformer 37 for reducing the voltage of alternating current to the circuit including wires 31 and 32. An automatic switch 38, responsive to pressure, is connected in the line 35 and is controlled by a thermostat 39, disposed within the cabinet 19 for making and breaking the circuit to the motor 28 to control the temperature within the cabinet.

Referring specifically to Figs. 2, 7, 8, 9 and 10, the compressor 21 includes a cylinder 43 which is flared outwardly as at 44 to form a low pressure chamber 45 into which the pipe 20 empties. The upper end of the cylinder 43 is also flared outwardly to form a shoulder 46. A cylinder head 48 rests upon the upper part of cylinder 43 and includes a skirt 49 which closely embraces the upper part of cylinder 43. The lower end 50 of the skirt is bent inwardly, as by a spinning operation, so as to closely embrace the shoulder 46. If desirable, the joints between cylinder and cylinder head may be sealed by solder or by welding. The discharge pipe 22 is connected with the interior of the head 48. Preferably, the pipes 20 and 22 are hermetically sealed by solder at the joints 52 and 53.

A groove 54 is formed in the upper end of cylinder 43 to thereby form a circular valve seat 55. The cooperating discharge valve 57 is in the form of a disk which is attached centrally by a rivet 58 to the hub 59 of a leaf spring 60. This leaf spring 60 includes preferably three radially extending resilient fingers 61 the ends of which are arranged to bind with an interior wall 63 of the cylinder head and are biased to urge the valve 57 on its seat but are adapted to flex to permit the valve to open under pressure thereunder.

A hollow cylindrical piston 65 reciprocates within the cylinder 43. The head or upper end of the piston is open as at 66 but is provided with inwardly projecting boss means in the form of a bead 67. The piston or inlet valve 68 is in the form of a disk having a diameter of slightly less than the diameter of the interior of the cylinder 43, sufficient clearance only being maintained between the periphery of the valve and the wall of the cylinder to insure non-contact therebetween. Like valve 57, valve 68 is attached to the hub 69 of a leaf spring 70 by a rivet 72. The three fingers 73 of the leaf spring extend underneath the bead 67 and are biased to yieldingly maintain the valve 68 on its seat 74 but are sufficiently resilient to permit the valve to open under certain pressure conditions.

An abutment 75 having three relatively rigid fingers 76 is arranged to engage the undersides of bead 67, the three fingers being interspersed between the fingers 73 of leaf spring 70 as clearly shown in Figs. 9 and 10. A coil spring 78 is interposed between the fingers 76 and the core 79 of a field magnet 80, there being a socket 81 in the upper end of the core for receiving the lower end of the spring. This spring 78 normally tends to urge the piston 65 upwardly.

The lower end of the piston 65 is flared outwardly as at 83 and then downwardly to form a skirt 84. The flared portion 83 is perforated at 85 so that the interior of the piston 65 communicates with the low pressure chamber 45. It will be apparent that when the piston 65 moves downwardly, the pressure within the cylinder 43 above the piston will be reduced and the valve 68 will be lifted from its seat whereby a charge of gaseous refrigerant will flow to above the piston thus causing a reduction of pressure in the evaporator 18. When the piston 65 moves upwardly, this charge of gaseous refrigerant will be compressed since the inlet valve 68 will be closed. The compressed refrigerant will lift outlet valve 57 from its seat and the compressed charge of refrigerant will flow to the condenser 23 where it is liquefied.

The motor for driving the piston 43 is similar to the motor of the so called "dynamic speaker" employed on radio receiving sets. The stationary winding may carry alternating current and the movable winding direct current or vice versa or both windings may carry alternating current and in the latter case the construction or arrangement will be such so that there will be phase displacement between the windings. In the embodiment illustrated in Figs. 1 and 2, the stationary winding 87 carries direct current and the movable winding 88 carries alternating current.

Referring to Fig. 2, the stationary winding 87 surrounds the cylindrical core 79 of a field frame 89. The frame 89 is formed of magnetic material and includes cylindrical side walls 91 and a cover of magnetic material 92 which is held in place by screws 93. The core 79 is undercut, as at 95, and the skirt 44' of cylinder 43 is hermetically joined at this undercut section.

The lower end of skirt 84 of piston 65 carries the movable coil 88. In the preferred embodiment, a cylinder 97 of dielectric material, such as Bakelite, is suitably secured to the skirt 84. The periphery of the cylinder is threaded (see Fig. 11) and turns of coil 88 are wound in the grooves of threads. In this manner a lightly insulated or preferably a non-insulated wire may be used. The upper end of core 79 is further undercut as at 99 so that the lower part of skirt 84, cylinder 97 and coil 88 can reciprocate freely between the skirt 44 and the upper part of core 79. Current for coil 88 is led into the chamber 45 by hermetic sealing and insulating type binding posts, one of which is shown at 101. One end of coil 88 is connected with a free coil 102 which is free of the cylinder 97. The other end of free coil 102 is connected with one of the binding posts. The other end of coil 88 is connected with a like free coil 103 and the other end of free coil 103 is connected to the other binding post 101. These free coils 102 and 103 are spaced from one another at all times and are formed of highly resilient wire in order to take care of flexing when the coil 88 reciprocates.

The cylinder 43 and the piston 65 or at least the skirt 44 and skirt 84 or portions thereof are formed from non-magnetic material and it will be noted that coil 88 is interposed in the air gap between the core 79 and the cover 92. Now, when, for example, direct current is impressed on coil 87 and alternating current is impressed on coil 88, coil 88 will move upwardly when the current therein flows in one direction and downwardly when the current flows in the opposite direction therein thus causing reciprocation of piston 65 which in turn causes the pumping or compressing action.

In the embodiment illustrated in Fig. 2, the walls of the piston would be approximately .02 to .03 of an inch thick and therefore are relatively light. It is readily apparent that since the piston is light, it can be stopped and reversed readily and the stopping and reversing of the small mass is effected gradually by reason of the sine wave character of the alternating current.

The major work to be performed, in the embodiment illustrated in Fig. 2, is on the upstroke of the piston and in order to balance the work of the motor during the upstroke and downstroke, I utilize the spring 78. This spring 78 is biased to move the piston 43 upwardly and thereby assists in moving the piston during the compression stroke. The spring 78 is compressed during the downstroke of the piston and therefore the work of the motor is stored for use on the next compression stroke.

Pumps of this type are generally employed in systems in which the pressure, against which they are required to pump, varies. In view of the fact that the piston floats in the cylinder, i. e., it is not mechanically connected to a fixed positioned driver, the variation in pressure would tend to vary the upper extent of movement of the piston. For example, when the compressor or pump is started, it may be required to pump against a relatively low pressure and as the compression continues, the pressure, against which the compressor must work, may be much higher. When the compressor is working against no pressure or relatively light pressure, the piston will reciprocate in the upper part of the cylinder but when working against a higher pressure, it will tend to reciprocate in a lower range in the cylinder.

I have found various ways in which to compensate for the variation in pressure and the different embodiments illustrate some of the preferred forms for causing the piston to operate in its extreme upper range. In Figs. 3 and 4, I have shown an embodiment in which I utilize pressure of the compressed fluid as a motive force for compensating for the variation in such pressure. In this embodiment, the core 79 is hollow to form a guide 105 for a push rod 106. The spring 78 rests in a cup 107 formed on the upper end of the rod 106. The lower end of rod 106 carries a flange 109 hermetically joined with the lower end of a metallic bellows 110. The upper end of bellows 110 is hermetically joined with the base of field frame 89. Bellows 110 is disposed in a chamber 111 formed by a cup 112 and the cup is hermetically joined with the frame by screws 113 and gasket 114. Chamber 111 is connected by a pipe 116 with the receiver 24. Bellows 110 will contract and expand in accordance with increase and decrease, respectively, of pressure in chamber 111 to respectively increase and decrease the compression of spring 78. Therefore, the tension of spring 78 will be increased and decreased to compensate for the pressures against which the piston 65 must operate. In this manner, the piston will reach the desired height on each compression stroke thereof. It is desirable to balance for variable pressures within the low pressure side of the pump and therefore the cross section of the active pressure area tending to expand the bellows or contract the same, due to pressure or sub-atmospheric condition within the low pressure side, should be such so as to compensate for the pressure tending to force the piston upwardly or downwardly, as the case may be.

Another embodiment, in which the pressure of the fluid being compressed is utilized for compensating for the variation of such pressure, is shown in Fig. 5 wherein the electromotive force is varied. In the embodiment illustrated a variable resistance 114 is disposed in the circuit of the movable coil 88. This variable resistance 114 may be any suitable type and I have illustrated a carbon pile 116 which is controlled by a bellows 117 connected by a pipe 118 to the receiver 24. When the pressure in the receiver 24 increases, the bellows operates to compress the carbon 116 to reduce the resistance offered thereby and consequently permit more current to flow to coil 88 to thereby increase the motive force on the piston. Of course when the pressure in the receiver 24 recedes, the bellows 117 will operate to cause the resistance of the carbon pile to increase and thereby impede the flow of current to coil 88. In this manner, the lifting motive force on the piston is increased and decreased in accordance with increase and decrease, respectively, in pressure against which the piston must work whereby the piston will always rise to a predetermined height regardless of pressure conditions in the high pressure side of the system.

In Fig. 6, I have shown another form of the invention embodying a variable resistance in series with the coil 88. Herein the variable resistance 114 is in the form of a potentiometer including a resistance coil 120 and a cooperating brush 121 which is adapted to be moved along the coil 120, to vary the length thereof, by worm gears 122 and 123, gear 123 being driven by a reversible motor 125. When the motor 125 rotates in one direction, it will cause more turns of coil 120 to be included in series with movable coil 88 and when the motor 125 rotates in the opposite direction, it will remove some of the turns of coil 120. Thus the current flow through coil 88 can be increased and decreased.

One side of motor 125 is connected by wire 126 to main 34 and the other side of the motor is connected by wire 127 to main 35. Three wires 128, 129 and 130 lead from the motor 125. Wire 128 is common to either wire 129 or 130. Wire 128 is connected to the field frame 87 and wires 129 and 130 are connected, respectively, to contacts 131 and 132 through insulating and hermetic sealing type binding posts 133 and 134. A brush 136 is carried by the piston 65 and reciprocates therewith.

A preferred form of my invention utilizes a motor 125 of the shaded pole type including opposed field windings. When energized simultaneously these windings neutralize each other to maintain the motor inoperative. However when the circuit to one of the windings is broken the motor will be rendered operative by the other winding which is still energized. In this manner the direction of rotation of the motor may be controlled in accordance with the field winding energized. In the embodiment shown in Fig. 6 the movable contact or brush 136 slidably contacts both stationary contacts 131 and 132 when the piston 65 is reciprocating in the normal range. However when the piston 65 is caused to reciprocate out of its normal range, due to increase or decrease of pressure within the system, the slidable contact 136 is moved to a point where it only contacts one of the stationary contacts. Under this condition the motor starts to rotate to cause more or less resistance of coil 120 to be placed in circuit with the winding 88. This causes the piston 65 to again be reciprocated within its normal range in which position the two field windings are again energized to cause the motor 125 to become inoperative. Therefore, if the piston 65 tends to rise too high in the cylinder, more resistance is cut in the circuit of coil 88 thus reducing the driving electromotive force for the piston. If the piston tends to reciprocate in a too low range, brush 136 will engage the lower contact 132 only and cause a circuit to the motor to be established through wire 130 whereby the reversible motor 125 will rotate then to cut out a turn or turns of coil 120. This in effect will increase the current flow to movable coil 88 and the range of reciprocation of the piston 65 will be raised to that desired. The piston 65 will tend to reciprocate normally in a range in which brush 136 contacts both contact 131 and contact 132, however, if the load on piston 65 increases, the motor 125 will be rotated to cut out some of the resistance 120 and resistance will be progressively cut out until such amount is removed to cause the coil 88 to operate the piston in its proper range. If the load on the piston 65 decreases, then motor 125 will operate to progressively cut in more of resistance 120 until such amount of resistance is cut in to cause the coil to operate the piston in its proper range. In this manner the proper limit of movement of the piston is maintained substantially constant.

Preferably the circuit for motor 125 is controlled also by the thermostat 39 so that during the idle period of the compressor, the circuit to the motor 125 is interrupted by switch 38.

I have found that satisfactory results can be obtained when four hundred volts direct current are impressed on the stationary coil 87 and about thirty volts alternating current on the moving coil 88. I have also found that alternating current can be used for both the stationary and movable coils simultaneously. Such system is shown in Fig. 12 wherein the powerpack includes a second transformer 138 for increasing the voltage of the alternating current on coil 87. In this embodiment, the phases of the two coils should be displaced and such displacement can be controlled by a suitable device such as a condenser 139. The phase displacement can be ninety degrees, however such displacement may be other than ninety degrees and in that event, the high current values can be utilized on the up stroke of the piston and the low current values on the downstroke. In this manner a lighter spring 78 can be utilized. It is quite obvious that the system employing alternating current to both coils 87 and 88, is applicable to all of the aforementioned embodiments and if employed in embodiments such as that shown in Fig. 5 or 6, the variable resistance 114 will be connected as shown in Fig. 12. If used in connection with the compressor shown in Fig. 3, the resistance 114 will be omitted.

Figure 13:
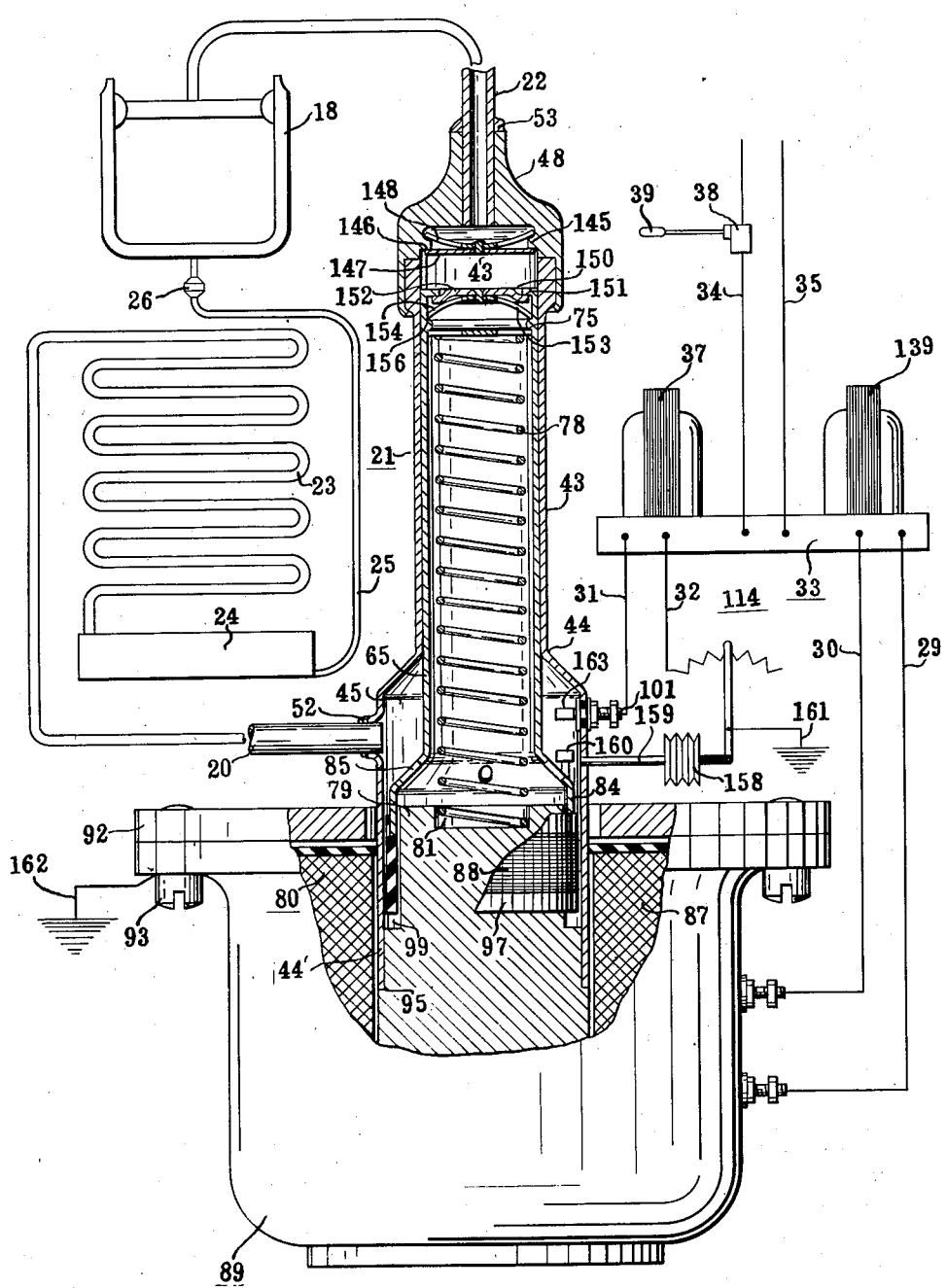
Fig. 13 is a side view partly in section showing still another form of compressor.

In the embodiment shown in Fig. 13, the chamber 45 and the interior of piston 65 form the high pressure chamber and when the compressor is connected as part of a refrigerating system, the pipe 20 delivers compressed refrigerant to condenser 23 and the pipe 22 delivers low pressure gaseous refrigerant from the outlet of the evaporator 18. The cylinder head 48 is provided with an inwardly extending boss means in the form of a bead 145 and forms a valve seat 146. An inlet valve 147 is urged toward seat 146 by a leaf spring 148. Spring 148, valve 147 assembly is like the valve 68 and spring 70 assembly and spring 148 is hooked over bead 145 like spring 70 is hooked over bead 67. The under side of the head 150 of piston 65 forms a valve seat 151 for an inwardly opening outlet valve 152. Valve 152 is saucer shaped to substantially fill the opening in the valve head 150 when the valve is closed. The valve is urged toward its seat by a leaf spring 153 which is constructed like spring 60 and is formed as an assembly with valve 153. The fingers 154 of spring 152 bear against the top of a bead 156 in the piston 65. The abutment 75 for spring 78 bears against the underside of bead 156.

On the down stroke of the piston 65, a charge of fluid passes the valve 147 and enters cylinder 43 and since the piston or outlet valve 152 is closed, the fluid in the high pressure side of the compressor, namely that in chamber 45 and the interior of piston 65, will be compressed. On the upstroke of piston 65, valve 147 will be closed and the charge of fluid above piston head 150 will be compressed, causing valve 152 to open and thus permit the charge to enter the piston 65.

In the embodiment illustrated in Fig. 13, electromotive force is utilized only for driving the piston 65 downwardly and simultaneously further compressing spring 78 and the piston is driven upwardly by the spring. Substantially all of the work of compressing is performed on the down stroke of the piston. The work performed by the spring 78 is the lifting of the piston and the overcoming of the tension of leaf spring 153.

The preferred electrical system for this embodiment also is illustrated in Fig. 13. The stationary field coil 87 is energized by relatively high voltage alternating current from the transformer 138 and the movable coil 88 is energized by relatively low voltage alternating current from the transformer 37. The switch 38 and thermostat 39 are utilized also for interrupting the current to the mains 34 and 35. Also the variable resistance 114 is included in the circuit of coil 88 and the bellows 158 for operating the same is connected by a pipe 159 to the high pressure chamber 45. The resistance of 114 is increased and decreased in accordance with the decrease and increase, respectively, of pressure within chamber 45 whereby the electromotive force of coil 88 is decreased and increased, respectively, with increase and decrease of load on the piston 65.

As previously referred to, coil 88 is energized only for the downstroke in embodiment Fig. 13. A preferred manner of so energizing coil 88 is to ground an end thereof on the reciprocating piston 65 and connect the other end thereof to a contact 160 carried by the piston. One side of the circuit is grounded at 161 and the compressor is grounded at 162. The other side of the circuit is connected to a stationary contact 163 disposed within chamber 45 and insulated from the compressor. Contact 160 is moved upwardly with piston 65 by spring 78 and is arranged to engage contact 163. When it engages contact 163, a circuit is completed to coil 88 and this coil is so wound with respect to coil 87 that it will, due to phase displacement between the current impressed on said coils, move downwardly and thereby drive piston 65 downwardly. The arrangement is such that contact 160 slides on contact 163 during the extreme upper part of the upstroke and during this upward movement, the coil 88 is energized and provides a dynamic brake to limit the upward movement of the piston 65. The speed of the upward movement of the piston is controlled by the pressure in chamber 45 but it will be apparent that the effect of the dynamic brake is also varied by the pressure in the chamber 45 to thereby increase and decrease, respectively, the braking power to the piston in accordance with the increase and decrease of upward speed of the piston. In this manner, the height to which the piston moves is maintained relatively constant for varying pressures in the high pressure side of the compressor.

The field winding 87, when energized, maintains the core 79 and the lower part of skirt 44' relatively warm. Therefore, the heat generated will prevent condensation of gaseous refrigerant in the lower part of chamber 45.

I have discovered that any of the pumps or compressors herein disclosed can be operated without oil when used in a relatively low temperature system such as a refrigerating system. This is made possible by providing the long guiding surface for the piston 65 and the application of the driving force, to the piston, entirely axially of the cylinder 43, thus eliminating entirely all side thrust, the relatively long piston and cylinder assuring direct alignment of these members at all times. The piston 65 and cylinder 43 are to be close fitting so that the piston effectively seals the top of the cylinder from chamber 45. Both of the contacting walls of the piston and cylinder should be highly polished to minimize friction and both of these surfaces should be hard, but not necessarily hardened. Preferably the piston is plated, for example, with chromium and the surfaces lapped to fit. I have found that when a compressor is made in accordance with these specifications, it can be operated without oil and will not heat excessively when employed, to pump at the necessary pressure, in a refrigerating system containing the refrigerants in use today.

The skirt 44' of cylinder 43 and the skirt 84 of piston 65 should be formed of non-magnetic material and if it is desirable either or both of the upper parts of the cylinder or piston, which contact with one another, may be formed of non-magnetic material.

From the foregoing, it will be apparent that certain advantages are present in this invention. The compressor can be manufactured at a relatively low cost. Many of the parts including the cylinder and piston can be formed out of sheet metal. No bearings for rotating parts are necessary, the cylinder forming the only guide for the piston.

The coil 87 of insulated wire is disposed outside of the fluid system of the compressor and the wire of coil 88 is held in place in the grooves of the threads of Bakelite cylinder 97 and therefore coil 88 need not be wound with insulation. In this manner insulating lint etc., is eliminated from the system.

I have provided a compressor embodying a floating type piston and mechanism for causing such compressor to operate efficiently under varying load conditions. Various embodiments are illustrative of mechanisms for causing the piston to move to the extreme end of its compression stroke regardless of the load on the piston and such mechanisms are also arranged for increasing and decreasing the motive force on the piston in direct accordance with the increasing and decreasing loads on the piston.

The oilless refrigerating system is of material advantage. The highest efficiency in refrigeration can be obtained because the pressure temperature characteristics of the refrigerant are not adversely modified by oil in the system but are maintained true.

While the forms of embodiment of the present invention as herein disclosed constitute preferred forms, it is to be understood that other forms might be adopted all coming within the scope of the claims which follow.

I claim:

1. A fluid compressor and driving mechanism therefor, comprising in combination a cylinder; a piston; one of the aforementioned members being arranged for floating movement relative to the other; means for imparting reciprocating movement to the movable member to cause the same to float in one direction; and means for preventing variation in fluid pressure from varying the extent of movement of said floating member.

2. A fluid compressor and driving mechanism therefor, comprising in combination a cylinder; a piston; one of the aforementioned members being arranged for floating movement relative to the other; means for imparting reciprocating movement to the movable member for the compression stroke, the pressure of the fluid being compressed tending to limit the extent of said movement of the floating member; and means responsive to the pressure of the fluid compressed for compensating for the tendency of the fluid being compressed.

3. A fluid compressor and driving mechanism therefor, comprising in combination a cylinder; a piston; one of the aforementioned members being arranged for floating movement relative to the other; means for imparting reciprocating movement to the movable member for the compression stroke, the pressure of the fluid being compressed exerting pressure on one side of the piston tending to limit the extent of said movement of the floating member; and means for causing the opposite side of the piston to be subjected to the pressure of the fluid compressed.

4. A fluid compressor and driving mechanism therefor, comprising in combination, a cylinder; a piston; one of the aforementioned members being arranged for floating movement relative to the other; electrically operated means for imparting reciprocating movement to the floating member, the pressure of the fluid being compressed tending to limit the extent of said movement of the floating member; and means responsive to variation of pressure of the fluid for varying the electrical effect of the electrically operated means.

5. A fluid compressor and driving mechanism therefor, comprising in combination, a cylinder; a piston; one of the aforementioned members being arranged for floating movement relative to the other; electrically operated means for imparting reciprocating movement to the floating member, the pressure of the fluid being compressed tending to limit the extent of said movement of the floating member; a variable resistance device for varying the voltage drop across the electrically operated means; and means responsive to variation of pressure of the fluid for controlling the resistance device.

6. A fluid compressor and driving mechanism therefor, comprising in combination, a cylinder; a piston; one of the aforementioned members being arranged for floating movement relative to the other; electrically operated means for imparting reciprocating movement to the floating member, the pressure of the fluid being compressed tending to limit the extent of said movement of the floating member, said electrically operated means including a stator element and a movable conductor element associated with the floating member for actuating the latter; a variable resistance device for controlling one of said elements; and means responsive to variation of pressure of the fluid for controlling the resistance device.

7. A fluid compressor and driving mechanism therefor, comprising in combination, a cylinder; a piston; one of the aforementioned members being arranged for floating movement relative to the other; electrically operated means for imparting reciprocating movement to the floating member, the pressure of the fluid being compressed tending to limit the extent of said movement of the floating member, said electrically operated means including a stator element and a movable conductor element associated with the floating member for actuating the latter; a variable resistance device connected in series with one of said elements; and means responsive to variation of pressure of the fluid for controlling the resistance device.

8. A fluid compressor and driving mechanism therefor, comprising in combination, a cylinder; a piston; one of the aforementioned members being arranged for reciprocatory floating movement relative to the other; means yieldingly tending to move said floating member in one direction and electrically operated means for moving the said member in the opposite direction, the pressure of the fluid being compressed tending to limit the extent of one of said movements of the floating member; and means responsive to variation of pressure of the fluid for varying the electrical effect of the electrically operated means.

9. A fluid compressor and driving mechanism therefor, comprising in combination, a cylinder; a piston; one of the aforementioned members being arranged for reciprocatory floating movement relative to the other; means for imparting reciprocatory movement to the floating member, the pressure of the fluid being compressed tending to limit the extent of said movement; and means responsive to variations of pressure of the fluid for varying the effectiveness of the first mentioned means.

10. A fluid compressor and driving mechanism therefor, comprising in combination, a cylinder; a piston; one of the aforementioned members being arranged for reciprocatory floating movement relative to the other; means yieldingly tending to move said floating member in one direction and electrically operated means for moving the said member in the opposite direction, the pressure of the fluid being compressed tending to limit the extent of one of said movements of the floating member; and means responsive to variation of pressure of the fluid for varying the effect of the first mentioned means.

11. A fluid compressor and driving mechanism therefor, comprising in combination, a cylinder; a piston; one of the aforementioned members being arranged for reciprocatory floating movement relative to the other; means yieldingly tending to move said floating member in one direction and electrically operated means for moving the said member in the opposite direction, the pressure of the fluid being compressed tending to limit the extent of one of said movements of the floating member; and means responsive to increase and decrease of pressure of the fluid being compressed for increasing and decreasing respectively the electrical effect of the electrically operated means.

12. A fluid compressor and driving mechanism therefor, comprising in combination, a cylinder; a piston; one of the aforementioned members being arranged for reciprocatory floating movement relative to the other; means yieldingly tending to move said floating member in one direction and electrically operated means for moving the said member in the opposite direction, the pressure of the fluid being compressed tending to limit the extent of one of said movements of the floating member; and means responsive to increase and decrease of pressure of the fluid being compressed for decreasing and increasing respectively the yielding effect of the first mentioned means.

13. A fluid compressor and driving mechanism therefor, comprising in combination, a cylinder; a piston; one of the aforementioned members being arranged for floating movement relative to the other; electrically operated means for imparting reciprocating movement to the floating member, the pressure of the fluid being compressed tending to limit the extent of said movement of the floating member; and means responsive to variation of pressure of the fluid for compensating for the tendency to limit the extent of said movement of the floating member.

14. A fluid compressor and driving mechanism therefor, comprising in combination a cylinder; a piston; one of the aforementioned members being arranged for floating movement relative to the other; means for imparting reciprocating movement to the movable member for the compression stroke, the pressure of the fluid being compressed tending to limit the extent of said movement of the floating member, and means responsive to pressure of the fluid for compensating for the tendency of the fluid being compressed.

15. A fluid compressor and driving mechanism therefor comprising in combination, a cylinder member and piston member arranged for floating movement relative to each other, electrically operated means for imparting reciprocating movement to one of said members, the pressure of the fluid being compressed tending to limit the extent of said movement, said electrically operated means including a stator winding and a movable winding associated with the moving member for actuating the latter, said stator winding and said movable winding being associated with each other electrically so that said movable winding is moved away from said stator winding when current is flowing therethrough in one direction to thereby move said movable member in one direction and so that said movable winding is moved toward said stator element when current is moving through the movable winding in another direction to thereby move said movable member in the other direction, a variable resistance device for controlling one of said windings and means responsive to variation of pressure of the fluid for controlling the resistance device.

ANDREW A. KUCHER.